Nov. 3, 1964 W. C. BELK 3,155,132

METHOD OF AND APPARATUS FOR SECTIONIZING CITRUS FRUIT

Filed April 20, 1962 8 Sheets-Sheet 1

INVENTOR
WILBER C. BELK

BY Hans G. Hoffmeister

ATTORNEY

Nov. 3, 1964 W. C. BELK 3,155,132

METHOD OF AND APPARATUS FOR SECTIONIZING CITRUS FRUIT

Filed April 20, 1962 8 Sheets-Sheet 2

INVENTOR
WILBER C. BELK

BY Hans G. Hoffmeister

ATTORNEY

Nov. 3, 1964 W. C. BELK 3,155,132

METHOD OF AND APPARATUS FOR SECTIONIZING CITRUS FRUIT

Filed April 20, 1962 8 Sheets-Sheet 3

INVENTOR
WILBER C. BELK

BY Hans G. Hoffmeister

ATTORNEY

METHOD OF AND APPARATUS FOR SECTIONIZING CITRUS FRUIT

Filed April 20, 1962

INVENTOR
WILBER C. BELK

BY Hans G. Hoffmeister

ATTORNEY

INVENTOR
WILBER C. BELK
BY Hans G. Hoffmeister
ATTORNEY

INVENTOR
WILBER C. BELK

BY Hans G. Hoffmeister
ATTORNEY

FIG. 8
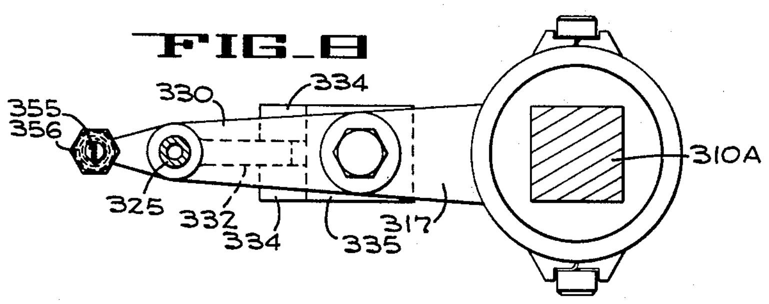
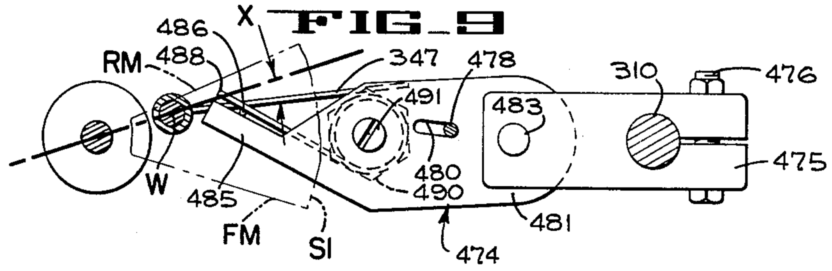
FIG. 9
FIG. 10
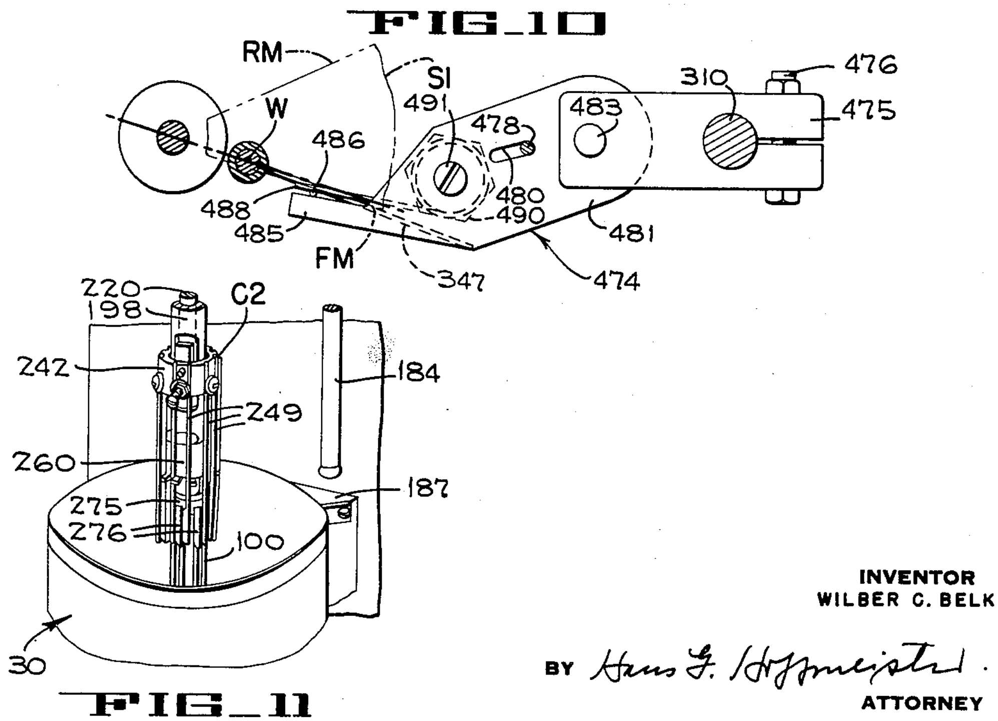
FIG. 10, FIG. 11
INVENTOR
WILBER C. BELK
BY Hans G. Hoffmeister
ATTORNEY Nov. 3, 1964 W. C. BELK 3,155,132

METHOD OF AND APPARATUS FOR SECTIONIZING CITRUS FRUIT

Filed April 20, 1962 8 Sheets-Sheet 8

INVENTOR
WILBER C. BELK

BY Hans G. Hoffmeister

ATTORNEY 3,155,132

METHOD OF AND APPARATUS FOR SECTIONIZING CITRUS FRUIT

Wilber C. Belk, Lakeland, Fla., assignor to FMC Corporation, San Jose, Calif., a corporation of Delaware Filed Apr. 20, 1962, Ser. No. 188,998
16 Claims. (Cl. 146—236)

The present invention pertains to a method of sectionizing citrus fruit and more particularly to an improved sectionizing tool for carrying out the method.

In certain machines for sectionizing citrus fruit, sectionizing blades are moved downwardly through the fruit, which has been oriented with its stem-blossom axis disposed vertically, to separate the meat segments of the fruit from the adjacent radial membrane of the fruit. To effectively separate a membrane from a segment, it is necessary that the blade be positioned adjacent the membrane as it moves downwardly through the fruit. To position the blade adjacent the membrane, it has been proposed to form an elongated element, or probe, on the lower end of each blade so that this probe can be inserted in the fruit a short distance and then moved laterally to "find" the membrane. With this arrangement, when the membrane is found, the blade will be adjacent the membrane due to the fact that it is integral with the probe. This mechanism has met with a considerable amount of success. However, it has been found that at certain periods during the fruit processing season, the two thin films which form each radial membrane of a citrus fruit tend to separate from each other and permit the probe and the blade to become positioned between the thin films. Then, when the blade is again moved downwardly, the blade splits the core of the fruit and permits it to drop away from the spindle on which it is supported. Also, while a membrane will split enough to permit the blade to become lodged, it is very difficult to complete the splitting of the membrane. Accordingly, if a blade becomes lodged between the films of the membrane, further downward movement of the blade has a tendency to crush the fruit down on the spindle rather than complete the difficult job of splitting the membrane. Also, it has been found that, when the elongate probe is moved down through the fruit, it is often deflected by seeds and is broken by engagement with other parts of the mechanism.

Accordingly, it is an object of the present invention to provide an improved sectionizing blade for a citrus fruit sectionizing machine.

Another object is to provide a two-piece sectionizing tool wherein the probe is separate from the sectionizing blade.

Another object is to provide a mechanism for controlling the movements of a probe independently of the associated sectionizing blade.

Another object is to provide an improved method of separating meat segments from adjacent membranes of a citrus fruit.

Other and further features and objects of the present invention will become apparent from the following description taken in connection with the accompanying drawings, in which:

FIGURE 8 is a fragmentary diagrammatic section taken on line 8—8 of FIGURE 5.

FIGURES 9 and 10 are diagrammatic sections particularly showing two operating positions of the two piece blade of the present invention, said sections being taken on line 9—9 of FIG. 5, but showing a linkage that is oppositely disposed from the linkage shown in FIGURE 5 which is a view of a different sectionizing head.

FIGURE 11 is a fragmentary diagrammatic perspective showing one of two path cutting units mounted on the machine.

Figure 1:
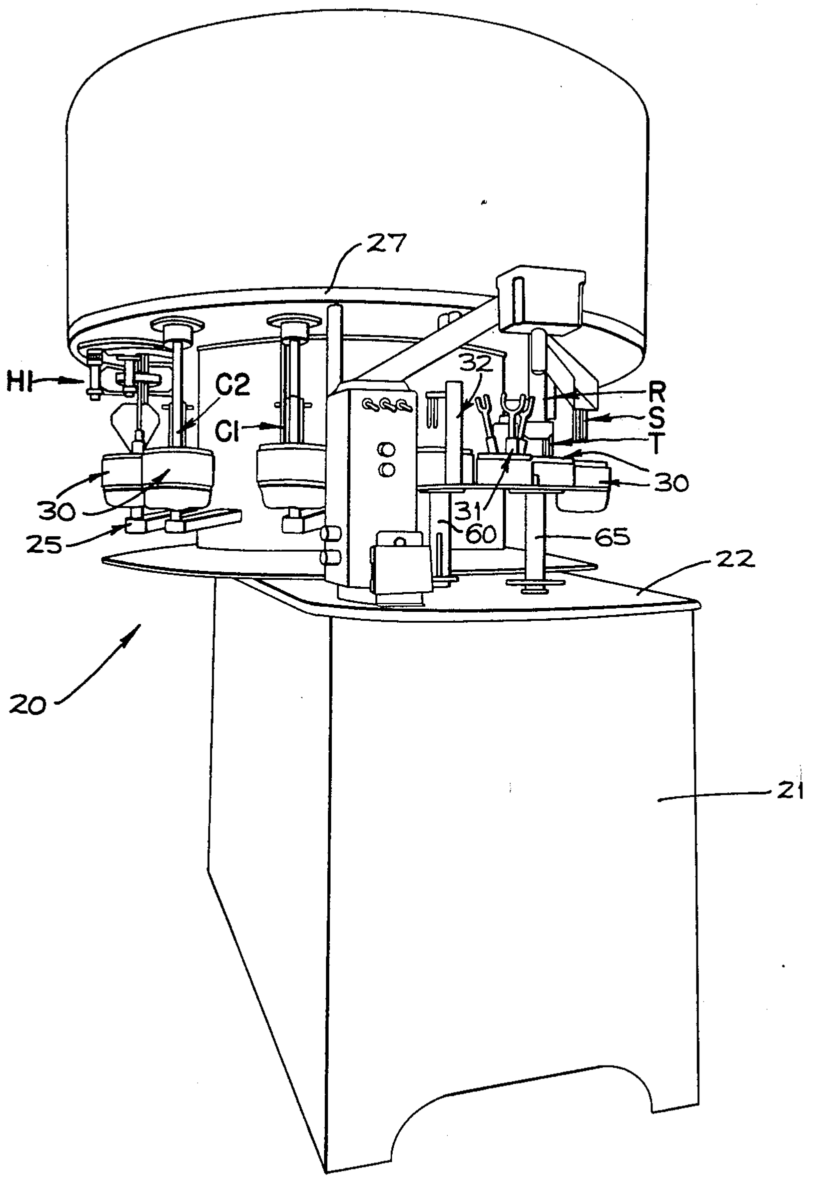
FIGURE 1 is a diagrammatic perspective taken looking at one end of a sectionizing machine having the improved sectionizing tool of the present invention.

The sectionizing machine 20 on which the two-piece blade of the present invention is mounted is identical to the machine disclosed in my pending application Ser. No. 109,798, filed March 9, 1961, and said application is incorporated by reference in the present application for details of construction not specifically described hereinafter.

The machine 20 comprises a base 21 (FIGS. 1 and 4) having a fixed table top 22 that has a central opening. A stationary tubular post 24 is secured in the base and projects upwardly through the opening 23. Near the upper end of the post 24, a main turret 25 is mounted for rotation around the post, and an inner tubular post 26 is slidably journalled inside the main post 24 in suitable bushings. A circular tool carrier plate 27 is mounted on the upper end of the slidable post 26 which is arranged to be raised and lowered by a lift mechanism 28. When the tool carrier 27 is raised and lowered, it moves several fruit processing units mounted thereon into and out of engagement with fruit held in twelve fruit carriers 30 which are mounted around the periphery of the turret 25 at twelve equi-spaced positions designated as Stations 1–12 in the plan view of FIGURE 3. The fruit processing units include a first path cutter C1 (FIG. 1) at Station 2, a second path cutter C2 at Station 3, six sectionizing heads H1–H6 (FIGS. 2 and 3) at Stations 4–9 respectively, a fruit shaker S at Station 10, a spinner T (FIG. 1) at Station 11, and a core remover R at Station 12. There is no fruit processing unit on the tool carrier 27 at Station 1 since, at this station, the only operation that takes place is the depositing of a fruit in the carrier. Also mounted above the table top 22 is a fruit feed turret 31 and a transfer turret 32.

Figure 3:
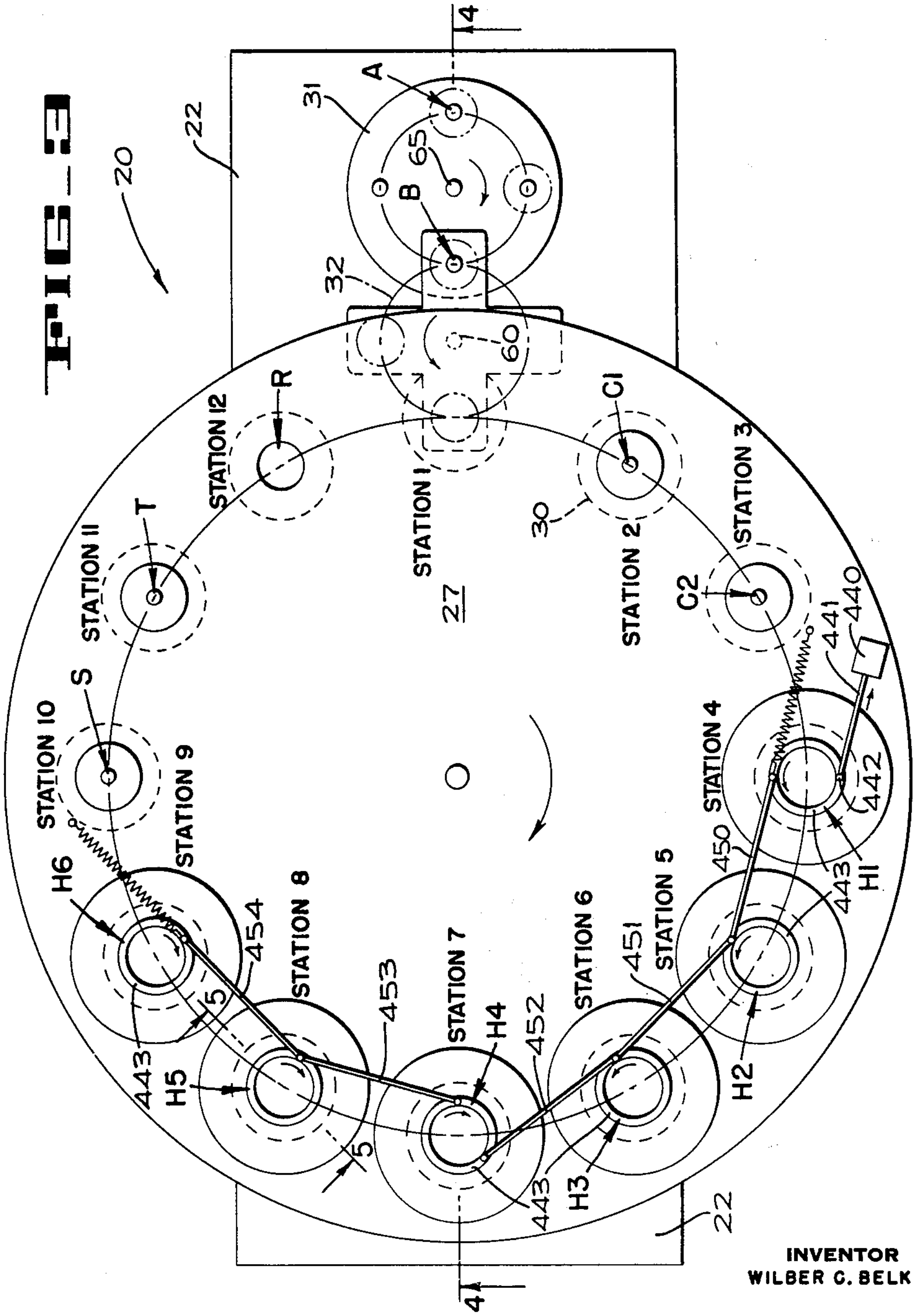
FIGURE 3 is a schematic top plan of the machine of FIGURE 1.

During operation of the machine 20, fruit to be sectionized are advanced on a supply conveyor (not shown) to a point within reach of an operator who is positioned adjacent the feed turret 31 (FIG. 3). The operator places the grapefruit, one by one, on the feed turret at Station A, said turret being arranged to be intermittently indexed through 90° angular movements in a clockwise direction (FIG. 3) to bring each grapefruit to a transfer Station B where the fruit is automatically transferred from the feed turret to a transfer turret 32 which is also arranged to be intermittently indexed in 90° increments in synchronism with the movements of feed turret 31, but in a counterclockwise direction. The grapefruit is then moved to a Station 1 of the main turret where it is deposited in one of the fruit carriers 30.

The main turret 25 is arranged to be intermittently indexed through 30° angular increments in a clockwise direction (FIG. 3) to move the grapefruit successively to the twelve stations of the machine.

The feed turret 31 and the transfer turret 32 are identical to the feed and transfer turrets of the sectionizing machine disclosed in the copending U.S. application of H. W. Grotewold, Ser No. 730,335, filed April 23, 1958, now patent No. 3,072,160, and assigned to the assignee of the present invention. Since these turrets do not form part of the present invention, they will not be described in detail, however, reference may be had to the above-identified application for a complete description of any mechanisms of the present machine that is not described herein in detail.

Figure 4:
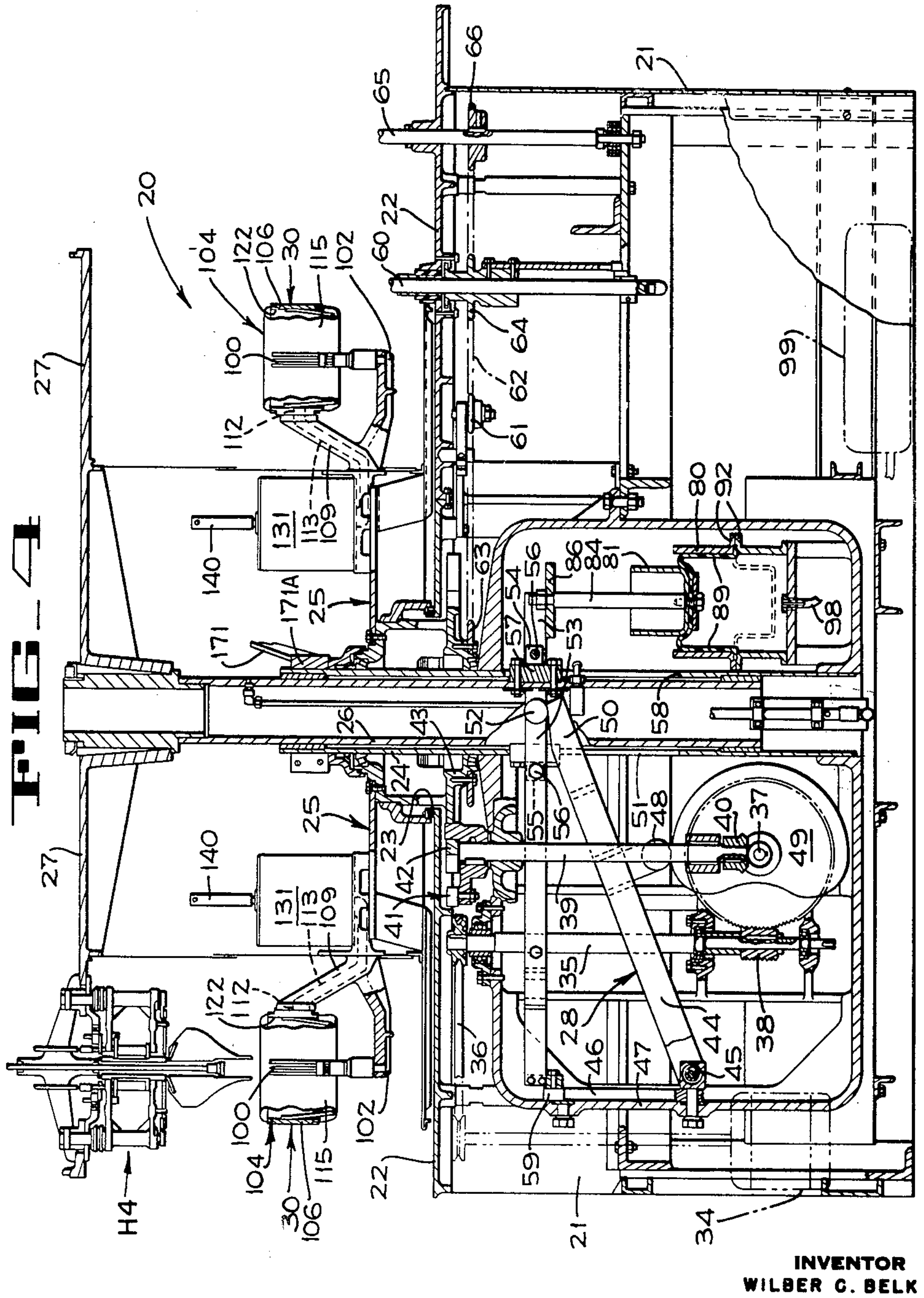
FIGURE 4 is a diagrammatic longitudinal vertical section taken on line 4—4 of FIGURE 3.

The drive mechanism for the machine is mounted in the base 21 and includes a motor 34 that is shown in phantom lines in sectional view FIGURE 4 since it is located ahead of the plane of this section. The motor drives a vertical shaft 35 through a belt and pulley drive 36. A horizontal shaft 37, which is driven from shaft 35 through a worm gear unit 38, drives a second vertical shaft 39 by means of a bevel gear unit 40. The vertical shaft 39 effects intermittent movement of the main turret 25 through a Geneva drive mechanism 41 which has a driven gear 42 formed on a lower hub portion 43 of the turret 25.

The lift mechanism 28 which controls the raising and lowering of the inner slidable tubular post 26 comprises a lever 44 pivotally mounted at 45 on the lower end of a vertical guide bar 46 that is bolted to a rigid wall 47 of the base 21. A roller follower 48, that is carried by the lever 44, rides along the surface of a cam 49 which is keyed to shaft 37. The lever 44 has a yoke 50 formed on its outer end which engages two diametrically opposed rollers 52 (one only being shown) that are carried by a pair of parallel bars 53. The bars 53 are secured together by two transverse bars 54 and 55 to which the bars 53 are secured by capscrews 56. A pad 57, formed on transverse bar 54, projects through an opening 58 in the stationary post 24 and is bolted to the inner slidable post 26. The transverse bar 55 is bolted to the slidable post 26 in the same manner. Thus, when the cam 49 is rotated, the lift mechanism 28 raises and lowers the slidable post 26 by means of the collar formed by the parallel bars 53 and transverse bars 54 and 55.

To prevent rotation of the post 26 while it is being raised and lowered, two rollers 59 (one only being shown) are mounted on the ends of the bars 53, one roller being disposed on each side of the fixed guide bar 46.

The transfer turret 32 has a drive shaft 60 that is driven from the hub portion 43 of the main turret 25 by a chain 62 that is trained around a sprocket 63 on said hub portion and an idler sprocket 61, and engages a sprocket 64 keyed to the transfer turret shaft 60. Similarly, a drive shaft 65 of the feed turret 31 is driven by the chain 62 which is disposed around a sprocket 66 keyed to the shaft 65. The chain is trained around sprockets 64 and 66 in opposite directions so that the two turrets 31 and 32 are rotated in opposite directions. It will be evident that the three turrets 25, 31 and 32 are intermittently driven in timed relation through the Geneva drive 41.

The weight of the tool carrier plate 27 and its associated mechanism is carried jointly by the cam 49 and a pneumatic counterbalance mechanism which includes an open top cylinder 80, that is secured to the base, and a piston 81 that is slidable in the cylinder. A piston rod 84 is secured to a plate 86 that is bolted to the parallel bars 53, the upper end of rod 84 being disposed between the bars. A generally tubular, flexible, air tight expansible and contractible air reservoir 89 is disposed within cylinder 80 below the piston 81. The reservoir should be made of a thin material that is air tight, pliable, and resistant to citric acid. A material which has been found to be satisfactory is a nylon cloth impregnated with a synthetic rubber such as Nitrile. The reservoir 89 has an upper wall secured to the piston 81 and a lower annular end secured between annular flanges 92 of the cylinder. As the piston moves up and down in the cylinder, the reservoir flexes between the upper position shown in full lines to the lower dotted line position. An air conduit 98 extends through the lower wall of the cylinder and communicates with the interior of the air reservoir 89. The conduit 98 is also connected to an air supply such as the usual air bottle or container 99 in which air is maintained at a constant pressure. A manually adjustable pressure regulator (not shown) is provided to vary the air pressure to the reservoir.

When the tool carrier 27 is lowered under the control of the cam 49, air in the closed system below the piston 81 is compressed. Then, when the carrier 27 is again raised, the expanding air applies a lifting force through the bars 53 to augment the lifting force of the cam. By regulating the pressure of the air in the system, an optimum percentage of the weight of the tool carrier will be carried by the pneumatic system. It is desirable that the pneumatic system bear about 80 percent of the weight of the tool carrier 27. With such an arrangement, the machine operates smoothly, and the cam 49 and associated parts are small enough to be efficiently arranged in the base.

The construction and operation of the several fruit carriers 30 are disclosed in my above-mentioned application Ser. No. 109,798. In general, each carrier 30 comprises a prong unit 100 (FIG. 4) that is mounted at the outer end of a mounting bracket 102 which is bolted to the main turret 25. A pneumatic fruit holder 104 is disposed around each prong unit for gripping the fruit during the several sectionizing operations. Each holder comprises a rigid ring 106 which is bolted to the upper end of an upwardly projecting arm 109 of the mounting bracket 102. The ring 106 is provided with an air inlet opening which communicates with a passage 113 formed in the arm 109. A tubular fruit gripper member 115, which is made of thin pliable sheet material, such as the material from which the air reservoir 89 is made, has its upper end clamped around the upper edge of the ring 106 by a clamping band. The lower end of the tubular member 115 is clamped around the lower end of ring 106. Thus, the tubular gripper member cooperates with the inner wall of ring 106 to define an annular air chamber 122 which communicates with the air inlet opening 112.

Air is forced into the inflatable gripper through the passage 113 in the bracket 102 by the downward movement of a weighted piston (not shown) that is disposed for vertical movement in a cylinder 131. The cylinder is mounted on a radially inner portion of the bracket 102, and has a lower open end that communicates with the passage 113 in the arm 109. The piston in the cylinder 131 is secured to a rod 140 which projects out of the cylinder. During operation of the machine, a mechanism at station 10 grips the rod 140 and raises the piston, causing the air in the pneumatic gripper to be drawn back into the cylinder 131. The rod 140 is latched in this upper position and then, when the carrier is again moved to station 2, the rod is unlatched, permitting the piston to move downwardly and causing the gripper to be inflated into gripping contact with the fruit on the associated prong unit 100. The details of the cylinder 131, the lifting, latching and unlatching mechanisms are described in my abovementioned pending application, Serial No. 109,798.

Means are provided in machine 20 for cutting a path around the axis of the fruit at the blossom end to completely rupture and remove the peripheral membrane of the fruit and to cut short paths between adjacent radial membranes of the meat segments so that the probes of the sectionizing blades of heads H1–H6 may move laterally, and efficiently seek out the adjacent radial membrane. These path-cutting mechanisms C1 and C2 (FIG. 1) are also described in detail in my pending application. The two mechanisms are identical and, as seen in FIG. 11, the unit C2 includes a tubular shaft 198 that is connected to a support mechanism (not shown) which is mounted above the tool carrier 27 and is arranged to be supported by and move downwardly with the tool carrier for a limited distance. A rod 184 carried by the support mechanism engages an abutment 187 on the carrier 30 therebelow to stop the downward movement of the support mechanism and the shaft 198.

At its lower end, the shaft 198 carries a ring 275 from which a plurality of stabbers 276 depend. When the tool carrier 27 is lowered, the stabbers penetrate the end of the fruit at a plurality of spaced points. A rod 220 is slidably journalled inside said tubular shaft 198 and carries, at its lower end, a pair of rings 242 and 260. A plurality of thin elongate resilient cutters 249 are secured to and depend from the ring 242, each cutter being held in spaced relation to an adjacent stabber 276 by means of grooves in the ring 260.

Since the path cutting mechanisms C1 and C2 are disposed at Stations 2 and 3, they engage each fruit before it reaches the processing heads H1–H6. During operation, when the tool carrier 27 moves downwardly, the tubular shaft 198 moves the stabbers and cutters downward toward a fruit held on the prong unit 100 in the carrier 30. During the first part of the downward movement, the stabbers and cutters penetrate about ⅝ of an inch into the fruit. Although the carrier continues to move downwardly, the downward movement of the path cutting units is stopped when the rod 184 engages the abutment 187 on the carrier 30. When the stabbers and cutters are about ⅝ of an inch in the fruit, a mechanism is actuated which rotates the rod 220 and the rings 242 and 260 to move the cutters 249 laterally toward the stabbers. Since the stabbers and cutters are disposed at the same radial distance from the axis of shaft 198, they cooperate to cut arcuate paths between adjacent membranes of the citrus fruit. The path cutting heads C1 and C2 are so oriented relative to each other that the stabbers and cutters of head C2 cut paths between membranes in the spaces that might have been missed by head C1. As a result, by the time each fruit reaches Station 4, an arcuate path has been cut between substantially every pair of adjacent membranes of the fruit, and accordingly, all material which would normally resist lateral movement of the probe associated with the sectionizing blade will be removed.

Also, as explained in my application Serial No. 109,798, each cutter 249 is connected to a vibrating mechanism which reciprocates the cutter rapidly in a vertical direction during the path-cutting operation.

When a fruit reaches Station 4, it is impaled on a prong unit 100 and is held in a pneumatic gripper 115. While the turret is stationary, the sectionizing head H1 at Station 4 is carried downwardly by the tool carrier 27. The sectionizing heads H1–H6 at Stations 4–9 are identical and are substantially identical to the sectionizing heads disclosed in my application Serial No. 109,798 except that each of the blades of the head have been modified and the probe has been removed therefrom, and the probe associated with each blade has been mounted on the hold-down rod at the center of each head. As will appear presently, the probe and its associated blades make up the new sectionizing tool of the present invention.

Figure 2:
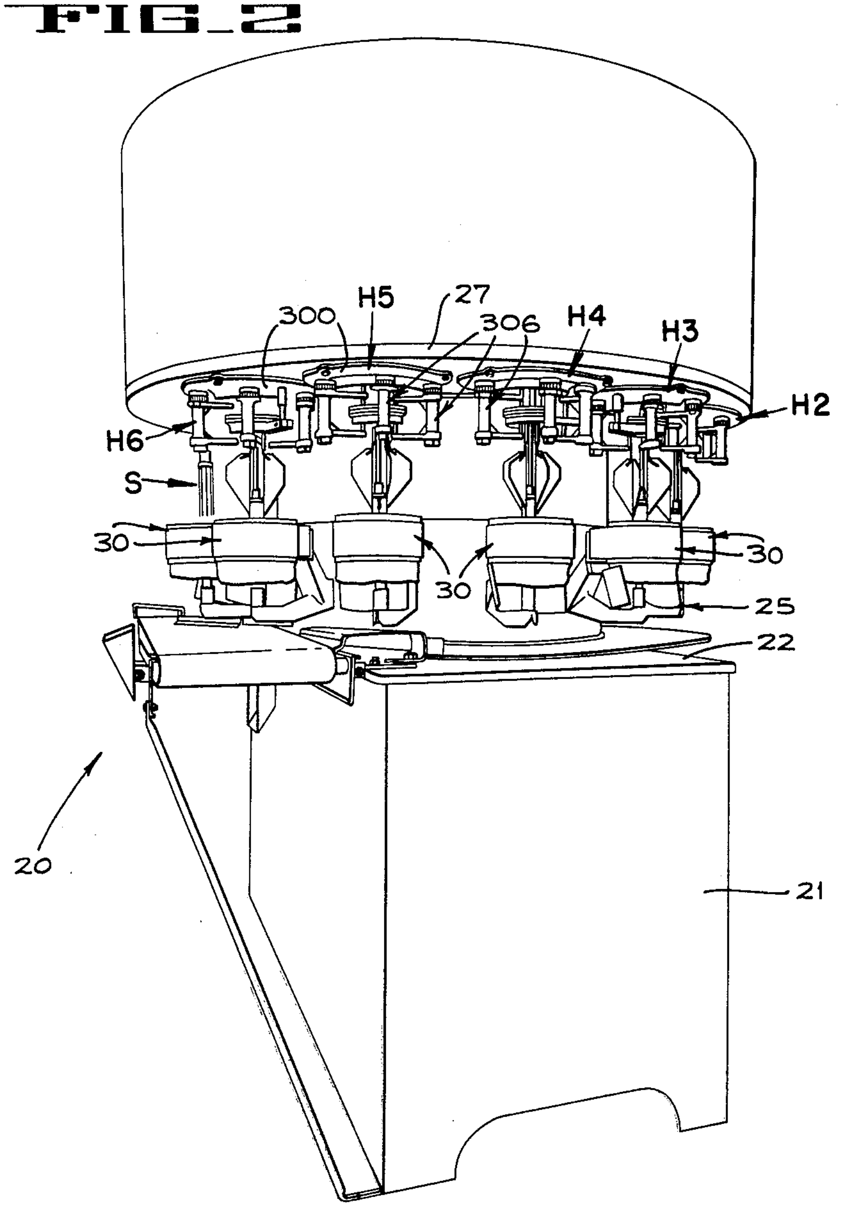
FIGURE 2 is a diagrammatic perspective taken looking at the end of the machine opposite to that shown in FIGURE 1.
Figures 5, 6:
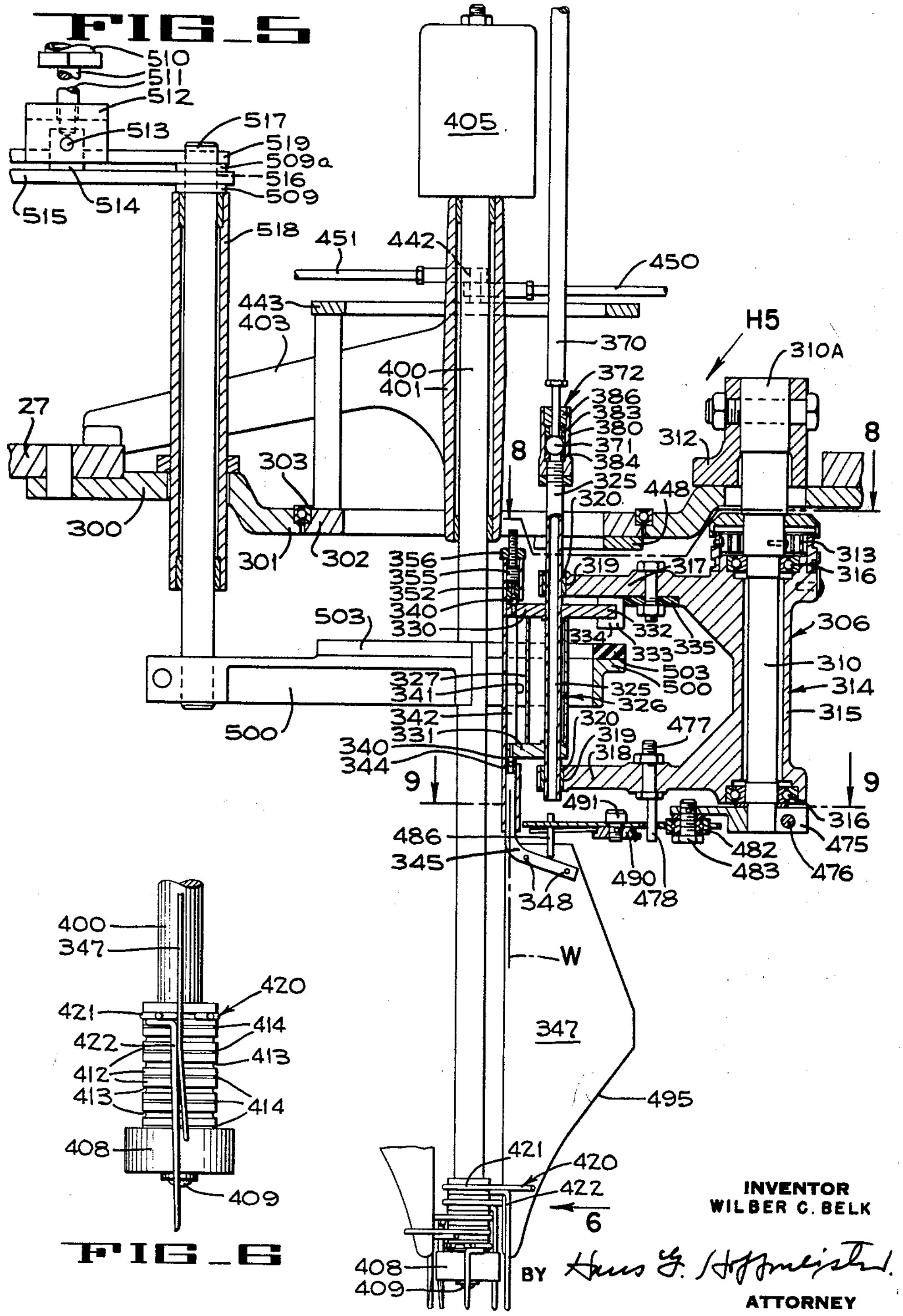
FIGURE 5 is a fragmentary, enlarged diagrammatic vertical section taken on line 5—5 of FIGURE 3.
FIGURE 6 is a fragmentary side elevation taken looking in the direction of arrow 6 of FIGURE 5.

As seen in FIGS. 1 and 5, each head comprises a rigid support ring 300 that is bolted to the tool carrier 27 and has a central opening 301 in which a ring 302 is rotatably mounted in a bearing assembly 303. Five blade control units 306 are mounted on the support ring 300 and, since these units are identical, only the one unit illustrated in FIG. 5 will be described in detail. Each control unit is provided with a shaft 310 which has an upper square end 310A bolted to one of five identical rigid blocks 312 welded to the upper surface of ring 300. A blade control member 314 has a tubular portion 315 journalled for rotation on the fixed shaft 310 by means of ball bearing units 316. A torsion spring 313 that is anchored in the fixed shaft 310 and to the upper end of tubular portion 315 tends to pivot the member 314 about shaft 310. The control member 314 has two laterally projecting arms 317 and 318, each of which is provided, near its outer end, with an opening 319 in which a bushing 320 is disposed. These spaced openings 319 slidably receive a tubular shaft 325 which is part of a blade support unit 326. The unit 326 includes a housing 327 that encloses the shaft 325 and is secured, as by welding, to an upper arm 330 and a lower arm 331. Each of the arms 330 and 331 has an opening in which the tubular shaft 325 is secured by a setscrew (not shown). Thus, the shaft 325, the arms 330 and 331, and the housing 327 form a rigid blade carrier that is mounted for vertical sliding movement at the outer ends of arms 317 and 318 of control member 314. The upper arm 330 has a rearwardly projecting portion 332 which is slidably disposed in a vertical channel 333 defined by two spaced guide blocks 334 (FIG. 8) that are integrally formed on a plate 335 that is bolted to the under side of arm 317. The blocks 334 are made of plastic. The spaced blocks 334 permit vertical reciprocating movement of the blade support unit 326 but prevent rotation of the unit relative to the carrier member 314.

Each of the arms 330 and 331 (FIG. 5) has a pivot pin 340 which is pressed in its outer end portion and projects through an elongate opening 341 cut in the side of a vertical tube 342. The pivot pin in the lower arm 331 has a conical point pivotally seated in a bearing 344 that is disposed in the tube 342, which tube also receives a rod 345 projecting upwardly from a sectionizing blade 347. The rod 345 is secured to the blade 347 by rivets 348 and to the tube 342 by rivets (not shown). The pivot pin 340 on the upper arm 330 has a conical point pivotally engaged in a bearing 352 which is slidably disposed in the upper end of the tube 342. The upper end of tube 342 is internally threaded to receive and adjusting screw 355 that bears against the slidable bearing 352. The screw 355 has a screw driver slot in its upper end and, by rotating screw 355, the bearing 352 can be adjusted to lock the blade on the support unit 326 for free pivotal movement about the axis defined by the pivot pins. A locknut 356 is threaded on the upper end of the adjusting screw 355 to lock it in selected position.

Each head includes a central hold-down rod 400 which is mounted for sliding movement in a vertical tubular support 401 that is held in fixed position in alignment with the axis of ring 302 by an arm 403 rigidly secured to and projecting upwardly and outwardly from the carrier plate 27. A weight 405 is mounted on the upper end of rod 400, and the engagement of the weight with the upper end of tubular support 401 limits the downward movement of the hold-down rod 400. A cylindrical fruit-contacting plug 408 is secured by capscrew 409 to the lower end of the rod, and a plurality of stainless steel bearing units 412 (FIG. 6) are disposed on the rod above the plug 408, each unit having an annular groove 413 therein. A shim 414 is disposed between each pair of adjacent bearing units to assure freedom of rotation of each bearing unit.

Figures 12, 13:
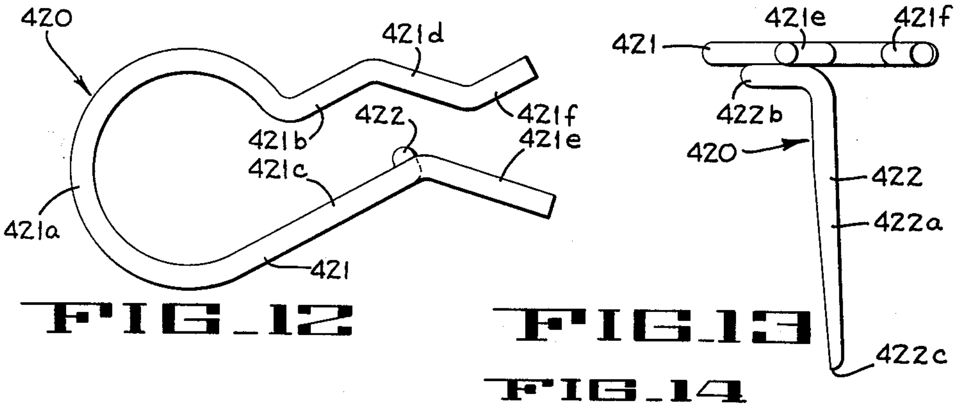
FIGURE 12 is a plan of a probe used in the machine.
FIGURE 13 is a side elevation of the probe of FIGURE 12.

It is a particular feature of the present invention that the probe usually connected to the lower end of each sectionizing blade has been removed from the blade and is mounted on the hold-down rod 400. Each probe 420 has an upper looped end 421 which is disposed in the annular groove of its associated bearing unit and is made of resilient material so that it grips the bearing and holds itself in place. As seen in FIG. 12, each looped end 421 has a hair pin configuration made up of a circular portion 421*a*, two generally parallel spaced sections 421*b* and 421c, two other generally parallel spaced sections 421d and 421e, and an end section 421f. The probe has a fruit-penetrating section 422 which has a prong portion 422a and an upper end portion 422b turned at about 90 degrees to the prong portion and welded to the underside of the hair pin section 421c. The lower end 422c of the prong is slightly flattened so that it will not cut into or penetrate the membrane.

It will be noted that there are five blades 347 on each head H1–H6 and, accordingly, there are five probes on the hold-down rod 400. Since the bearing units 412 are mounted in superposed relation, the prong portion 422 of each of the five probes is of a different length as seen in FIG. 5, the probe associated with the uppermost bearing unit having the longest prong. Accordingly, the lower ends of all five probes are in substantially the same horizontal plane and all of the probes will engage the fruit at the same time and will penetrate the same distance down into the fruit.

Figure 14:
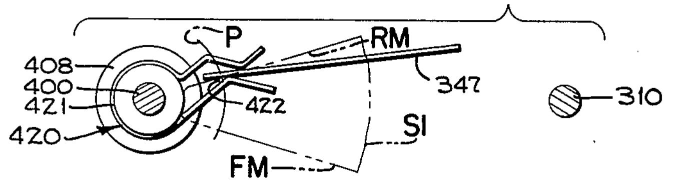
FIGURES 14 and 15 are schematic views showing two operating positions of the sectionizing tool of the present invention.
Figure 15:
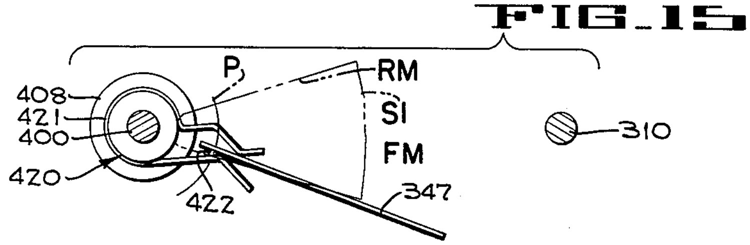

In FIGS. 14 and 15, the relationship of the blade to the probe is indicated. It will be noted that the blade 347 extends to a position between the arms of the hair pin upper end of the probe 420 so that, when the blade is swung in an arcuate path about the fixed shaft 310, as will be explained presently, the blade will engage the probe and rotate the probe and the outer race of its bearing about the axis of the hold-down rod 400. However, during the joint lateral movement of the probe and the blade, only the probe is in the fruit, the lower end of the blade being spaced above the fruit. Also, it should be noted that the prong portion 422 of each probe is disposed radially outwardly from the axis of the head substantially the same distance that the stabbers and cutters of the path cutting units C1 and C2 are spaced from the axis. Accordingly, as the probes move laterally to "find" the membrane, they travel along an arcuate path P in the arcuate openings made by the path cutters.

All five blades 347 of each head are simultaneously vibrated in a vertical direction by means of an eccentric drive mechanism which includes a plurality of rods 370 (FIG. 5) each rod having a ball 371 (FIG. 5) secured to its lower end and forming part of a universal joint 372 that is secured to the upper end of tubular shaft 325. Each rod is connected at its upper end to a universal joint that is identical to but oppositely disposed to the joint 372 and, besides the balls formed on the rod 370, each joint includes an internally threaded sleeve 380 which receives the threaded shank of the shaft 325, or the shank of a bolt (not shown) at the upper joint. The ball pivot member 371 is disposed between two seat members 383 and 384, and a tubular retainer screw 386 is threaded into the sleeve 380 to hold the members of the joint in operative association.

Figure 7:
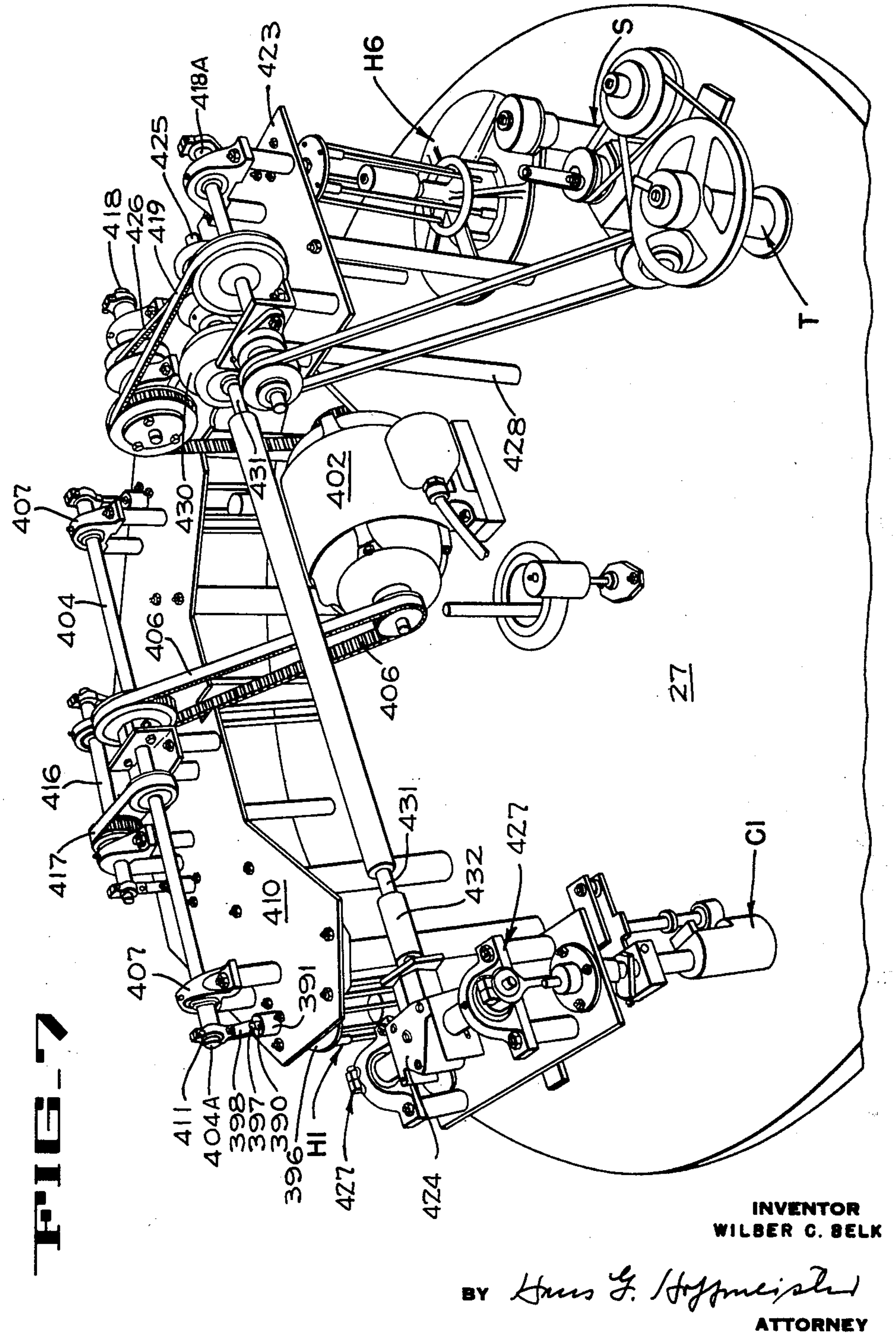
FIGURE 7 is a diagrammatic perspective looking downwardly at the drive mechanism on the top of the machine of FIGURE 1.

The construction and operation of the vibrating mechanism is disclosed fully in my application Serial No. 109,798. In general, it consists of a motor 402 (FIG. 7) that is mounted on the tool carrier 27 and drives a shaft 404 through a belt and pulley drive 406. The shaft 404 is mounted in bearings 407 that are secured on a plate 410 which is rigidly connected to and supported from the tool carrier 27. At one end 404A, the shaft 404 is operatively connected to an eccentric 411 associated with the sectionizing blades at Station 4. The eccentric 411 carries a spring strap 398 that is secured by a bolt 397 to a short shaft 390. The shaft 390 is slidably journalled in a bearing 391 and has a lower end (not shown) connected to a plate 396 on which the five blade support rods 370 are universally mounted. At its other end the shaft 404 is connected to the eccentric associated with the blades at Station 7. A second shaft 416 is mounted on plate 410 and is driven by a belt 417 from shaft 404. At its opposite ends, the shaft 416 is operatively connected to eccentrics at Stations 5 and 6. The motor 402 also drives two shafts 418 and 418A through a belt and pulley drive mechanism 419. These shafts are rotatably mounted in bearings on a plate 423 which is rigidly connected to the tool carrier 27 by a plurality of upstanding posts 428. The shaft 418 is operatively connected to the blade-vibrating eccentric at Station 8 and the shaft 418A is connected to the eccentric at Station 9. The shaft 418 also drives a short shaft 425 through a belt 426. This short shaft, which is journalled in bearings on plate 423, has a flexible coupling 430 connected to one end. This coupling may be of any commercial type having a drive shaft 431 that is rotatably driven by the input shaft 425 and can swing upwardly in a generally vertical direction. The drive shaft 431 is connected by a coupling 432 to a shaft projecting from a gear box 424 which drives eccentrics 427 that are operatively connected to the resilient cutters of the path-cutting mechanisms C1 and C2 to vibrate the cutters.

During the actual separation of the meat segments from the enclosing radial membranes of the fruit, the probe associated with each blade 347 is first moved downwardly about ⅝" into the fruit and is then moved laterally to find an adjacent radial membrane of the fruit. This lateral movement of the blade is effected by the torsion spring 313 (FIG. 5). In order that the blade can make this lateral movement, a cocking mechanism is provided for moving each blade rearwardly against the resistance of a spring. This cocking mechanism comprises a solenoid controlled air operated air cylinder 440 (FIG. 3) that has a push rod 441 pivotally connected to a post 442 which, as seen in the head illustrated in FIG. 5, projects upwardly from a ring 443 that is rigidly secured by posts 444 to the rotatable ring 302 of each sectionizing head. The ring 302 has a U-shaped member 448 which has two legs, one disposed on each side of the tube 325 projecting upwardly from each blade support unit 326. When the ring 302 is rotated, the U-shaped member engages the tube 325 and pivots the blade control member 314 about the axis of shaft 310 to move the blade to the cocked position.

In the present machine, the rings 443 of all six sectionizing heads are connected so that the air valve 440 will cock all six heads simultaneously. This connection comprises a rod 450 (FIG. 3) pivotally connected between the rings 443 of the heads at Stations 4 and 5, a rod 451 connected between the rings of Stations 5 and 6, a rod 452 connected between the rings of Stations 6 and 7, a rod 453 connected between the rings of Stations 7 and 8, and a rod 454 connected between the rings of Stations 8 and 9. It will be noted that the rings at Stations 7, 8 and 9 are rotated in an opposite direction to the direction of rotation of the rings of Stations 4, 5 and 6. Accordingly, as seen in FIG. 9 wherein the reference letter FM indicates the forward membrane of meat segment S1, and RM indicates the rear membrane, just before the probe 4, enters such a segment, the probe will be moved clockwise about shaft 310 to the cocked position of FIG. 9. Then when the blade is released by the cocking mechanism, it will be moved counterclockwise to seek out the forward membrane FM, as seen in FIG. 10. The mechanism illustrated in FIG. 9 is one associated with heads H1, H2 and H3 at Stations 4, 5 and 6. Blades at Stations 7, 8 and 9 will seek out the rear membranes RM.

It is necesasry that, when a blade contacts a radial membrane and is ready to be moved downwardly through the fruit, it be in a position parallel to or overlying the membrane at about a 5 degree angle as indicated by angle "X" in FIG. 9. Accordingly, a blade orienting mechanism 474 is provided in the present machine for maintaining the blade at this desirable angle relative to the radial membrane so that the blade will at all times be in position to be moved downwardly as soon as it contacts a membrane.

Referring to FIGS. 5 and 9, it will be seen that an arm 475 is provided with a split end portion that is clamped on the fixed shaft 310 by a bolt 476. Also, the lower arm 318 of the blade carrier member 314 has an opening in which a bolt 477 is adjustably secured. A pin 478, whose axis is spaced from the axis of the bolt 477, projects downwardly from the bolt and projects through a slot 480 (FIG. 9) in a lever 481 that is pivotally mounted by means of a ball bearing assembly 482 on a capscrew 483 that is threaded in the fixed arm 475. At its free end, the lever 481 has an arm 485 which is slanted relative to a longitudinal centerline of the lever. The slanted arm bears against one side of a pin 486 that is secured to and projects upwardly from the blade 347. A torsion spring 488 has one end portion bearing against the opposite side of the pin 486 and the other end wrapped around a cylindrical shank of a nut 490 (FIG. 5) that is locked to the lever 481 by a capscrew 491. The circular nut has a peripheral flange in which the end of the torsion spring is anchored. It is to be noted that the force with which the spring bears against the pin 486 can be varied by loosening the capscrew 491, rotating the nut, and locking the nut in the newly selected position. Also, it will be noted that by rotating the bolt 477, the eccentric pin 478 will move relative to a longitudinal centerline of the arm 318 and, accordingly, the lever 491 will be pivoted about its pivot axis. Thus, by means of the eccentric pin the initial position of blade 347 may be varied.

When the blade carrier member 314 (FIG. 5) is being cocked as mentioned above, it is rotated clockwise about shaft 310 (FIG. 9). During this movement, the pin 478 moves with the member 314 causing the lever 481 to pivot about the axis of capscrew 483. In FIG. 10, one uncocked position of the member 314 is shown. It will be noted that the blade 347 has been pivoted clockwise about the axis W defined by the pivot pins 340 (FIG. 5) but has maintained the angle between the blade and a radial membrane of the fruit substantially constant.

After the probe associated with blade 347 moves over into contact with a radial membrane of the fruit, and the blade is overlying the membrane, it is moved downwardly through the fruit. During the first part of this downward movement, the contact of the lower curved edge 495 (FIG. 5) of the blade with the top edge of the radial membrane will cause the blade to pivot about axis W bringing the blade to a position close against the face of the membrane from which the meat segment is being separated. Under some conditions, particularly when the membrane is not disposed generally radially of the fruit, the membrane tends to push the entire arm back before the blade can pivot about axis W and turn to a position parallel to the membrane. To overcome this difficulty, a brake mechanism is provided which comes into operation immediately after the blades have been released from their cocked position and have moved laterally into contact with the adjacent membrane. The brake engages each pivotal blade control member 314 and holds it in whatever position it is in when the associated blade "finds" the membrane, and this braking of the pivotal control members is maintained until the blades have moved far enough down into the fruit to cause them to pivot about axis W and attain a position parallel to the membrane. Usually the blade will have attained the necessary position after it has completed about one-third of its movement down through an average grapefruit.

Each head has a separate brake mechanism which comprises a metal ring 500 (FIG. 5) which encircles the hold-down rod 400 of the head and extends through the opening in each blade control unit 314 defined between the upper and lower arms 317 and 318, respectively. A rubber ring 503 is secured to the upper surface of the metal ring as by a suitable adhesive or capscrews. When the ring 500 is raised, the rubber ring 503 engages the lower surface of the plastic guide blocks 334 formed on the plate 335 that is bolted to the upper arm 317 of the blade control member 314, thus locking the control member 314 against pivotal movement.

The upward movement of the brake ring is accomplished by a solenoid-controlled, air operated power cylinder 510 that is supported by the support platform 423 (FIG. 7) and has a rod 511 (FIG. 5) threaded into a block 512 which is pivotally connected by a pin 513 to a tab 514, the tab being welded to and projecting upwardly from a cross bar 515. At each end, the cross bar 515 has an aperture 516 which receives a lift rod 517 which is slidably journalled in a tubular post 518 that is mounted in fixed position on the outer ring 300 of one of the heads. A nylon washer 509 is disposed between each post 518 and the cross bar 515, and a similar washer 509*a* is disposed between the bar 515 and a pin 519 which extends transversely through the upper end of the rod 517 and has an end portion disposed in a vertical slot in the block 512. When the air cylinder 510 is actuated, the rod 511 is raised causing the lift rods 517 of two heads to be elevated to raise the rubber brake rings into contact with the plastic guide blocks 334 of the two heads.

After the blade has covered about one-third of its vertical movement down through the fruit, the brake is released by deactivating the air cylinder. Release of the brake after the blade has finished turning is necessary because, in some cases the partitions are out of plumb, and the arm must be free to allow the blade to follow the partition in such cases.

Referring again to FIGURE 15, it will be apparent that the probe 421 has guided the blade to a position overlying the membrane FM. As the downward movement of the head continues, the vertically reciprocating blade slides down along the side surface of the probe which is substantially stationary due to the fact that the cylindrical plug 408 is resting on the top of the fruit. The blade moves into engagement with the membrane and is cammed counterclockwise (FIG. 15) by the membrane so that it assumes a position close to the membrane and effectively separates the membrane from the meat segment as it moves downwardly through the fruit.

Figure 16:
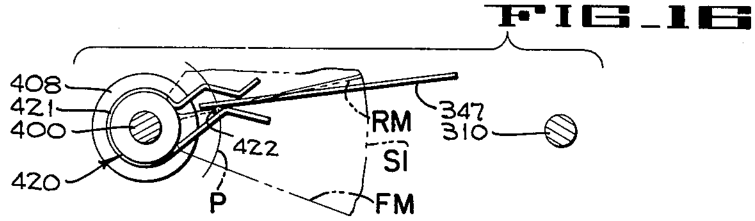
FIGURE 16 is a schematic view showing the use of the tool of the present invention with a fruit having a split membrane.

In FIGURE 16 a condition is illustrated wherein the probe has penetrated between adjacent films of a membrane while the blade and the probe are in the cocked position, similar to the position of FIG. 14. When the blade control mechanism is released and the blade tends to swing to the uncocked position, such movement will be resisted by the film of the membrane. Since the probe is not connected to a vibrating mechanism, its lower end portion remains at its lowered fruit engaging position approximately ⅝" down in the fruit. Thus the probe engages the membrane over an area which is large enough to prevent the spring-loaded probe from breaking through the film of the membrane. It will be apparent therefore that the provision of a probe that is separate from its associated vibrating blade and is therefore capable of maintaining full depth penetration in the fruit, overcomes the membrane-splitting problem that arises when the membrane separates into two films and only one film is available for resisting lateral movement of the spring-loaded probe.

In will be noted in FIG. 6 that, in one embodiment, the lower end of the blade 347 is bent outwardly away from the probe. Then, if the blade encounters a split membrane as in FIG. 16, the blade will not be trapped between the films of the membrane but will be alongside the membrane RM. When the blade is subsequently moved downwardly, the blade will be cammed to a position alongside the membrane.

It is within the scope of the present invention to make the blade entirely flat so that it closely hugs the probe as it moves downwardly.

Also, it should be noted that the probe does not move down through the fruit. In prior, one-piece blades, which have elongate probes integrally formed on their lower ends, the probes must move downwardly along the entire length of the fruit. Very often such long thin probes will engage a seed and be deflected inwardly toward the fruit support spindle so that interference between the probe and the spindle occurs with resulting bending or breaking of the probe. Accordingly, the feature of the present invention, whereby the probe is separate from the blade and does not move entirely through the fruit, eliminates possibility of damage to the sectionizing head.

Figure 17:
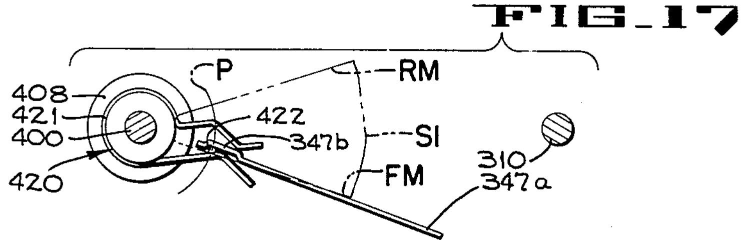
FIGURE 17 is a schematic showing of a modified sectionizing blade.

In FIGURE 17 a modified form of the sectionizing blade of the present invention is shown. This blade **347*a* is provided at its lower end with a vertical extending recess or groove 347*b* which is adapted to receive the prong portion of the probe 420**. With this arrangement, the blade will rest against the membrane of the fruit.

The actions of the blades and probes of all heads H1–H6 are substantially identical and, by the time the fruit reaches Station 10, the meat segments have been separated from the enclosing membranes. At Station 10 the shaker S (FIG. 3) loosens seeds from the meat segments and jars the segments to break any remaining connections to the membranes and, at Station 11, the spinner T strips the segments from the core.

At Station 12, the core and the membranes are removed from the prong unit by means of a core removal unit that is disclosed in the above-mentioned copending Grotewold application, Serial No. 730,335.

It will be understood that each of the solenoid-controlled air operated power cylinders mentioned herein consists of a pneumatic power cylinder, a valve arranged to control the flow of pressurized air to the cylinder, and a solenoid which shifts the valves of the various units. The solenoids associated with the air cylinder 440 (FIG. 3) of the blade cocking mechanisms, the cylinders of the path cutting units, the blade brake cylinder 510 (FIG. 5), and the clutch mechanisms of the shaker S and spinner T are all controlled from a central cam and switching unit (not shown) that has a cam shaft driven from the vertical drive shaft 39 (FIG. 4). A separate cam is mounted on the cam shaft for each of the above-mentioned solenoids and each cam actuates a separate microswitch that is electrically connected to the solenoid. Since the cam shaft is driven from the vertical shaft 39 (FIG. 4), it is evident that the actuation of the various air cylinders takes place in timed relation with the indexing of the turrent and the vertical movement of the tool carrier.

From the foregoing description it will be apparent that the present invention provides a two-piece sectionizing tool which makes possible a new efficient method of separating the meat segments of a grapefruit or the like from the enclosing membranes, said method comprising the positioning of a probe and a cutter alongside each other with the end of the probe spaced from the end of the cutter, moving the probe and the blade as a unit toward the fruit to move the end of the probe into the fruit while the blade is spaced from the fruit, moving the probe and the blade laterally to cause the probe to travel across the fruit to engage a membrane, and finally sliding the blade relative to the probe to penetrate into the fruit adjacent the probe to separate the membrane from the meat segment.

The mounting of the probes, independently of the blades, on rotatable bearing members makes possible the close coaction of the blades and their probes without causing the probes to interfere with the movement of the blades. Further, the use of the fruit-hold-down rod at the center of each head as a carrier for the probes assures that the probes will not penetrate too deep into the fruit. The hair pin configuration of the upper end of each probe provides a simple bearing-gripping arrangement and provides two arms which enclose the associated blade and maintain the necessary interengagement of the blade and the probe during lateral movement of these members.

While particular embodiments of the present invention have been shown and described, it will be understood that the apparatus is capable of modification and variation without departing from the principles of the invention, and that the scope of the invention should be limited only by the scope and proper interpretation of the claims appended hereto.

Having described my invention, what I claim as new and desire to protect by Letters Patent is:

1. In a sectionizing machine, means for supporting a fruit in fixed position, a generally vertically disposed probe positioned above said fruit support means, a sectionizing blade disposed parallel to and alongside said probe, means for moving said probe downwardly independently of said blade to position said probe a predetermined distance in the fruit, means for moving said blade laterally to engage the probe and move it laterally in the fruit to contact a membrane of the fruit and position said blade adjacent the membrane, and means for moving said blade downwardly through the fruit independently of said probe to separate a meat segment of the fruit from the membrane.

2. In a sectionizing machine, means for supporting a citrus fruit in fixed position with its stem-blossom axis oriented in a generally vertical direction, a probe mounted above said fruit-support means for vertical reciprocating movement toward and away from a fruit on said support means, means for moving said probe downwardly to penetrate into the fruit, a sectionizing blade mounted alongside said probe in a generally vertical position and arranged for movement laterally to a position above the fruit and closely adjacent said probe and for vertical movement downwardly relative to said probe to penetrate the fruit immediately adjacent said probe and means for moving said blade laterally and downwardly.

3. In a sectionizing machine, means for supporting a citrus fruit in fixed position with its stem-blossom axis oriented in a generally vertical direction, a probe mounted above said fruit-support means for pivoting about a vertical axis and for vertical reciprocating movement toward and away from a fruit on said support means, said probe having a pair of spaced arms projecting radially outwardly from said axis and a prong projecting downwardly from one of said arms, means for moving said probe downwardly to cause said prong to penetrate into the fruit, a sectionizing blade mounted alongside said probe in a generally vertical position and arranged for movement laterally to a position above the fruit and closely adjacent said probe and for vertical downward movement relative to said probe to penetrate the fruit immediately adjacent the point said probe is positioned in the fruit.

4. In a sectionizing machine, means for supporting a citrus fruit in fixed position with its stem-blossom axis oriented in a generally vertical direction, a fruit hold-down member mounted above said fruit support means for movement downwardly to engage the top surface of a fruit supported thereby, a probe mounted on said hold-down member for vertical reciprocating movement therewith toward and away from a fruit on said support means and for pivotal movement about said hold-down member, means for moving said probe downwardly to penetrate into the fruit, a sectionizing blade mounted alongside said probe in a generally vertical position and arranged for movement laterally to a position above the fruit and in contact with said probe and for vertical movement downwardly relative to said probe to penetrate the fruit immediately adjacent said probe, and means for moving said blade laterally and downwardly.

5. In a sectionizing machine, a cylindrical support member for supporting a citrus fruit in fixed position with its stem-blossom axis in a generally vertical position in substantial alignment with the axis of said cylindrical support member, a hold-down member mounted above said fruit support member in substantially vertical alignment with the axis of said cylindrical support member a probe mounted in resilient gripping engagement with said hold-down member and in vertical position above said fruit support member, means for moving said hold-down member downwardly to cause said probe to penetrate a fruit on said support adjacent the apex of a V-shaped meat segment of the fruit and between two adjacent radial membranes of the fruit, means for pivoting said probe about said hold-down member to move said probe laterally in the fruit to a position abutting one of said membranes, a sectionizing blade disposed above said fruit support member and having a portion adjacent said probe, means mounting said blade for lateral movement to a position in abutting relation with said probe when said probe has penetrated the fruit and said blade is spaced above the fruit and means for moving said blade laterally and downwardly alongside said probe to penetrate the fruit adjacent the probe.

6. In a sectionizing machine, a cylindrical support member for supporting a citrus fruit in fixed position with its stem-blossom axis in a generally vertical position in substantial alignment with the axis of said cylindrical support, a path-cutting mechanism mounted above said fruit member for movement downwardly to engage a fruit on said support member at a fixed radial distance from the axis of said support member, a probe mounted in vertical position above said fruit support member and adjacent an extension of said axis, means for moving said path-cutting mechanism in an arcuate path about said axis to cut an arcuate opening in the upper end of the fruit, means for moving said probe downwardly into said arcuate path and adjacent the apex of a V-shaped meat segment of the fruit and between two adjacent radial membranes of the fruit, means for moving said probe along said arcuate path to a position abutting one of said membranes, a sectionizing blade disposed above said fruit support member adjacent said probe, means mounting said blade for lateral movement to a position of abutting relation with said probe when said probe has penetrated the fruit and said blade is spaced above the fruit, and means for moving said blade downwardly alongside said probe to penetrate the fruit at a point adjacent the probe.

7. In a sectionizing machine, a cylindrical support member for supporting a citrus fruit in fixed position with its stem-blossom axis in a generally vertical position in substantial alignment with the axis of said cylindrical support, a probe mounted in vertical position above said fruit support member and adjacent an extension of said axis, means for moving said probe downwardly to penetrate a fruit on said support adjacent the apex of a V-shaped meat segment of the fruit and between two adjacent radial membranes of the fruit, means for moving said probe laterally to a position abutting one of said membranes, a sectionizing blade disposed above said fruit support member adjacent said probe, means mounting said blade for lateral movement to a position in abutting relation with said probe when said probe has penetrated the fruit and said blade is spaced above the fruit, and means for moving said blade downwardly alongside said probe to penetrate the fruit at a point adjacent the probe.

8. In a sectionizing machine, a vertically movable carrier, means for supporting a fruit below said carrier, a post mounted for vertical movement with said carrier and for sliding vertical movement relative to said carrier, a probe carried by said post and rotatable thereon about a vertical axis, a blade mounted on said carrier for vertical movement therewith, said blade having a lower edge adjacent said probe but spaced above the lower edge of said probe, means for moving said carrier downwardly from an elevated position through a first increment of movement to move said probe a predetermined distance into the fruit in said support means and to position the lower edge of said blade close to but spaced above the fruit, abutment means on said post and arranged to engage the top of the fruit to limit the depth of penetration of said probe, means for moving said blade laterally to urge said probe laterally in the fruit into abutting contact with a membrane of the fruit, movement of said probe into contact with the membrane being effective to position the blade adjacent the membrane, and means for moving said carrier downwardly through a second increment of movement to carry said blade through the fruit adjacent said membrane, the contact of said abutment means with the fruit being effective to prevent downward movement of said probe during the second movement of said carrier.

9. In a sectionizing machine, a turret mounted for rotation about a vertical axis, a plurality of fruit support members on said turret, means for periodically indexing said turret through fixed angular distances to move said support members to successive processing stations, a path-cutting mechanism mounted at one of said stations directly above a fruit support member on said turret, a tool carrier mounted above said turret for vertical reciprocating movement toward and away from said carriers, a path-cutting mechanism mounted on said tool carrier at a path-cutting station and movable into engagement with a fruit on the support member therebelow, means for moving said path-cutting mechanism along an arcuate path to cut an arcuate opening in the fruit, a probe mounted on said tool carrier at a station adjacent said path-cutting station, said probe being movable downwardly with said carrier into the arcuate opening cut in the fruit at said preceding path-cutting station, means for moving said probe along said arcuate opening into engagement with a membrane in the fruit, a sectionizing blade mounted on said carrier for vertical movement therewith and for horizontal movement relative thereto, and means for moving said blade laterally to a position of abutting contact with said probe when said probe is in the fruit, whereby during subsequent downward movement of said carrier, said blade will penetrate the fruit at a position close to said probe.

10. In a sectionizing machine, means for supporting a fruit in fixed position, a generally vertically disposed probe positioned above said fruit support means, a sectionizing blade disposed parallel to and alongside said probe and having a lower end bent outwardly away from said probe, means for moving said probe downwardly independently of said blade to move said probe a predetermined distance into the fruit, means for moving said blade laterally to move the probe laterally in the fruit to engage a membrane of the fruit and position said blade adjacent the membrane, and means for moving said blade downwardly through the fruit independently of said probe, the bent lower end of said probe being arranged to penetrate into the fruit at a point spaced a slight distance from said probe.

11. In a sectionizing machine, means for supporting a citrus fruit in fixed position with its stem-blossom axis oriented in a generally vertical direction, a probe mounted above said fruit-support means for vertical reciprocating movement toward and away from a fruit on said support means, means for moving said probe downwardly to penetrate into the fruit, and a sectionizing blade mounted alongside said probe in a generally vertical position and arranged for movement laterally to a position above the fruit and closely adjacent said probe and for vertical movement downwardly relative to said probe to penetrate the fruit immediately adjacent said probe, said blade having a vertically extending recess adjacent its lower end adapted to receive said probe during lateral movement of said blade whereby said probe is disposed substantially in the plane of said blade.

12. In a sectionizing machine, means for supporting a fruit in fixed position, a hold-down shaft mounted directly above said fruit support means for movement downwardly into engagement with a fruit on said support means, a bearing mounted on said hold-down shaft and having a portion rotatable about the axis of said shaft, a probe secured to said rotatable bearing portion and projecting outwardly from said shaft, means for moving said shaft downwardly to cause said probe to penetrate into the upper end of a fruit on said support means, means for pivoting said probe on said bearing, and a sectionizing blade mounted above said fruit support means and adjacent said probe for movement relative to said probe downwardly through the fruit closely adjacent said probe.

13. In a sectionizing machine, a cylindrical fruit support member for supporting a fruit in fixed position, a generally vertically disposed probe positioned above said fruit support member, a sectionizing blade disposed parallel to and alongside said probe, means for moving said probe downwardly independently of said blade to move said probe a predetermined distance into the fruit, means for moving said blade laterally to move the probe laterally in the fruit, to engage a membrane of the fruit and position said blade adjacent the membrane, means for maintaining said blade oriented at a predetermined angle relative to a radial plane projecting from the axis of said cylindrical fruit support member during said lateral movement, and means for moving said blade downwardly through the fruit independently of said probe to separate a meat segment of the fruit from the membrane.

14. In a sectionizing machine, means for supporting a citrus fruit in fixed position with its stem-blossom axis oriented in a generally vertical direction, a hold-down shaft mounted above said fruit support means in vertical alignment with said axis, a bearing unit mounted on said shaft, an enlarged fruit-contacting member secured to the lower end of said shaft immediately below said bearing unit, a probe mounted on said bearing unit for vertical reciprocating movement with said shaft toward and away from a fruit on said support means, means for moving said probe downwardly to penetrate into the fruit, and a sectionizing blade mounted alongside said probe in a generally vertical position and arranged for movement laterally to a position above the fruit and closely adjacent said probe and for vertical movement downwardly relative to said probe to penetrate the fruit immediately adjacent said probe.

15. A method of separating meat segments from membranes of citrus fruit which comprises the steps of holding a fruit in fixed position with its stem-blossom axis having a predetermined orientation, positioning a sectionizing blade and an elongate probe in side by side parallel relation with the end of the probe disposed in spaced relation to the end of said blade, moving said blade and said probe as a unit toward the fruit to move the end of the probe into the fruit while the end of the blade is still spaced from the fruit, maintaining said blade spaced above the fruit while moving said blade and said probe laterally causing said probe to move laterally in said fruit to engage a membrane, and finally sliding said blade relative to the probe to penetrate into the fruit adjacent the probe and separate the membrane from the adjacent meat segment.

16. A method of separating meat segment from membranes of citrus fruit which comprises the steps of holding a fruit in fixed position with its stem-blossom axis having a predetermined orientation, cutting an arcuate opening in one end of the fruit between two adjacent membranes, positioning a sectionizing blade alongside and parallel to an elongate probe with the end of the probe disposed in spaced relation to the end of said blade, moving said blade and said probe as a unit toward the fruit to move the end of the probe into the arcuate opening in the fruit and position the end of the blade in spaced relation to the end of the fruit, moving said blade and said probe laterally causing said probe to move laterally in said fruit to engage a membrane, and finally sliding said blade relative to the probe to penetrate into the fruit adjacent the probe and separate the membrane from the adjacent meat segment.

References Cited in the file of this patent

UNITED STATES PATENTS

| | | |
|---|---|---|
| 3,030,990 | Polk | Apr. 24, 1962 |
| 3,045,729 | Belk et al. | July 24, 1962 |